2 Sheets--Sheet 1.

G. E. HOPKINS & W. B. SHEDD.
Improvement in Machinery for Treating Fibrous Plants.
No. 123,103. Patented Jan. 30, 1872.

Witnesses  
Inventors  
Geo. E. Hopkins & Wm. B. Shedd  
by atty

G. E. HOPKINS & W. B. SHEDD.
Improvement in Machinery for Treating Fibrous Plants.
No. 123,103. Patented Jan. 30, 1872.
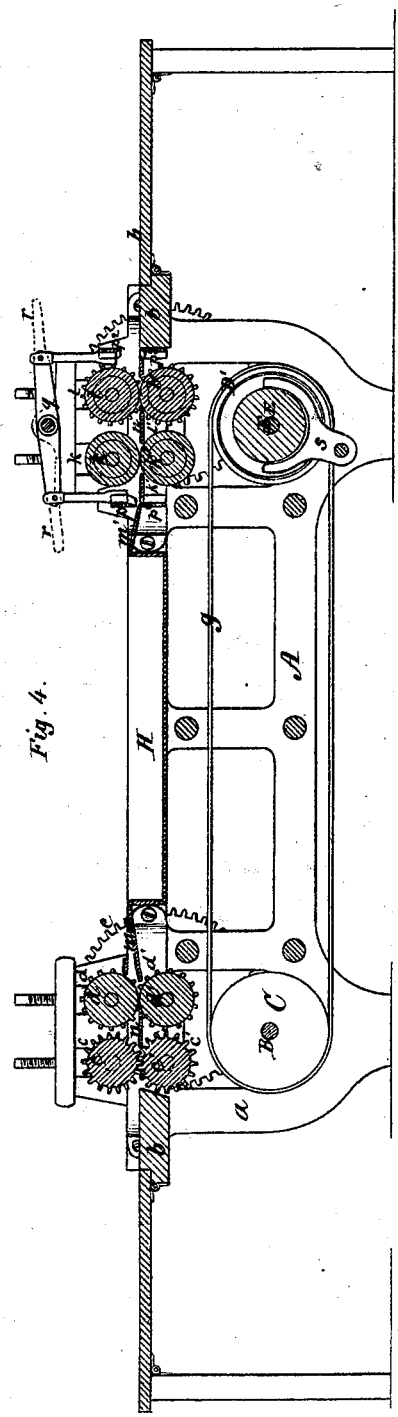
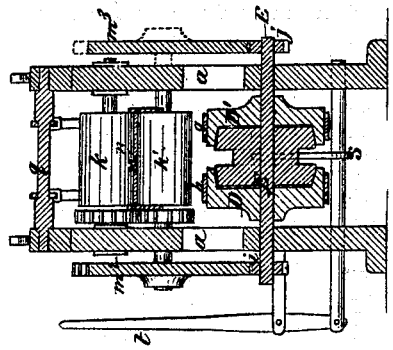
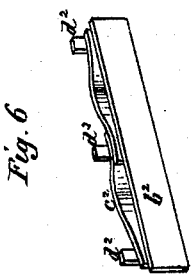
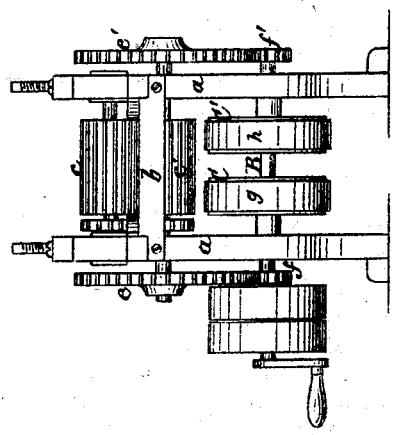

UNITED STATES PATENT OFFICE.

GEORGE E. HOPKINS AND WILLIAM B. SHEDD, OF BOSTON, MASSACHUSETTS ASSIGNORS TO AMERICAN FIBER COMPANY, OF SAME PLACE.

IMPROVEMENT IN MACHINERY FOR TREATING FIBROUS PLANTS.

Specification forming part of Letters Patent No. 123,103, dated January 30, 1872.

*To all to whom these presents shall come:*

Be it known that we, GEORGE E. HOPKINS and WILLIAM B. SHEDD, both of Boston, in the county of Suffolk and Commonwealth of Massachusetts, have made an invention of certain new and useful Improvements in Machinery for Treating Fibrous Plants or Substances; and do hereby declare the following to be a full, clear, and exact description thereof, due reference being had to the accompanying drawing making part of this specification, and in which—

Figure 1:
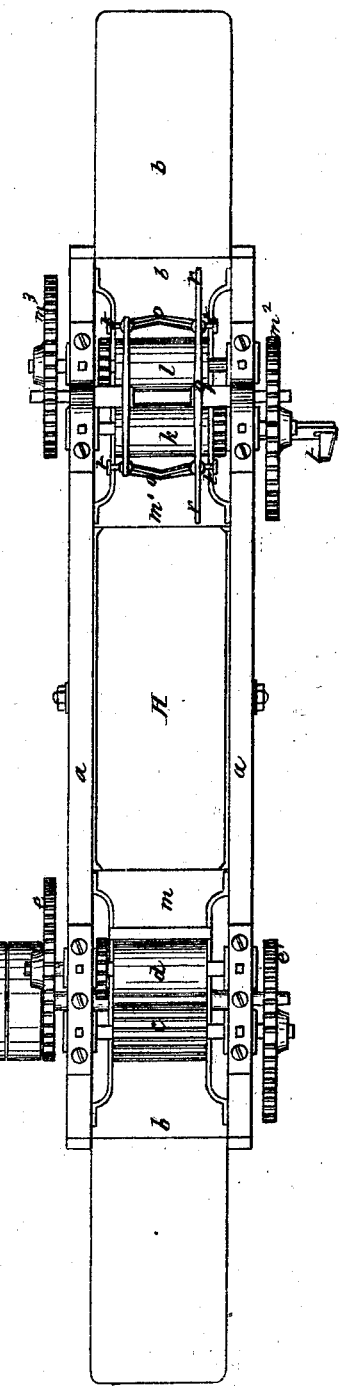
Figure 2:
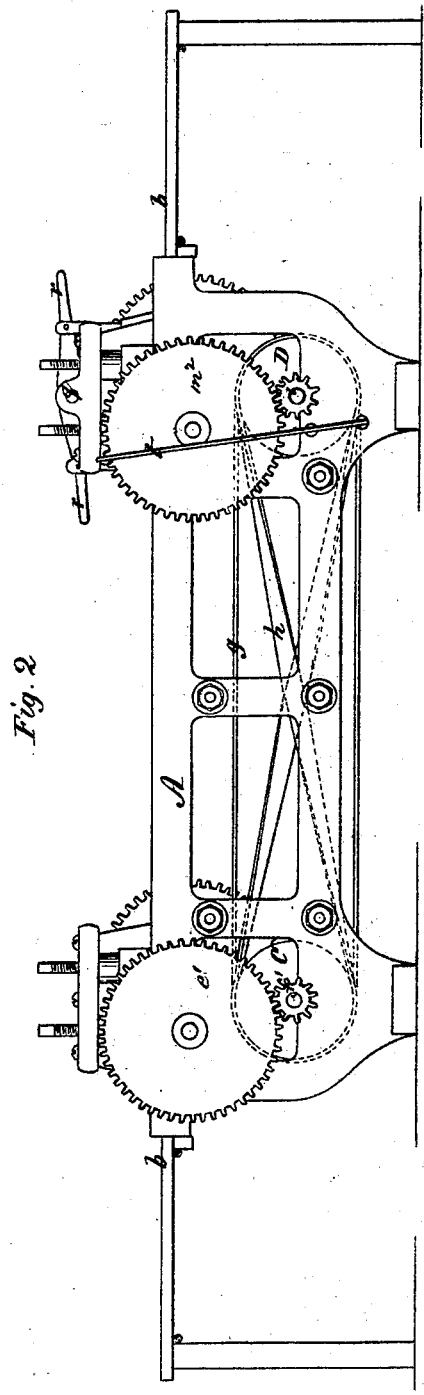

Figure 1 is a plan, Fig. 2 a side elevation, Fig. 3 a front elevation, Fig. 4 a vertical and longitudinal section, and Fig. 5 a vertical and transverse section of a machine embodying our improvements.

Our present invention may, in some respects, be considered an improvement upon the machinery shown and described in Letters Patent of the United States, issued to us on the 20th day of December, 1870, for machinery for crushing, scraping, and cleaning the leaves or stalks of the *Agave Americana* or American aloe, (more familiarly known as Sisal grass or hemp), or China grass, or other fibrous, pulpy leaves or stems of plants, and delivering the fibers from the machine in a uniformly even and straight mass, in a fit condition for baling or for a hackling-machine; and these improvements consist, first, in the introduction into such machines of a device for effecting a reversed or two-way motion of the feeding mechanism, which drags the leaf between the scrapers in order the more thoroughly to separate or detach its fibers and to clean such leaf entirely to its end, since, in machinery heretofore devised for this purpose, the butt of the leaf was not utilized, for the reason that a portion of it must be seized by the feeding-rollers in order to drag its remainder between the scrapers; and, secondly, these improvements consist in the employment of two sets of scrapers and their application in such manner that one or the other set may be brought into action at the proper time, according to which set of rollers is at work.

The organization of our present machine is as follows: A represents the frame proper of the machine, consisting of two long upright side standards, $a\ a$, united at each end by horizontal shelves or tables $b\ b$. At one end of this frame, and at the upper part thereof, are two sets of horizontal rollers, $c\ c'$ and $d\ d'$, the two first being fluted rollers, which mesh into one another, and the other plain cylinders, preferably covered with rubber, the outer extremity of each lower roll being provided with a spur-gear, $e$ or $e'$, fixed to it. Below the two sets of rollers above named, and revolving in suitable bearings formed in opposite sides of the frame A, is a horizontal transverse driving-shaft, B, upon each end of which is affixed a pinion, $f$ or $f'$, these pinions taking into gears $e'\ e$, before named. Intermediate between the standards $a\ a$ of the machine-frame are mounted upon the driving-shaft B two pulleys, $C\ C'$, which travel with the shaft, these two pulleys $C\ C'$ being belted with two pulleys, $D\ D'$, mounted loosely upon a second horizontal shaft, E, which is disposed at the opposite end of the machine-frame and revolves in bearings placed thereon; one of the belts—viz., $g$—being a plain belt, while the other belt, $h$, is crossed, by which means the two pulleys $D\ D'$ travel in opposite directions upon their shaft. To each end of the shaft E is affixed a toothed pinion, $i$ or $j$, while above the shaft E, in the frame A, are placed two sets of draft-rollers, $k\ k'$ and $l\ l'$; the arrangement of these last-named rollers and the shaft E, pulleys $D\ D$, and pinions $i\ j$ being substantially the same as those at the opposite end of the machine, which have been hereinbefore referred to. The last-named rolls $k\ k'$ and $l\ l'$ are, by preference, covered with or composed of rubber, and are draft-rollers to drag along the fiber, as hereinafter stated, and the lower ones are provided with gears $m^2$ or $m^3$ to mesh into the adjacent pinion $i$ or $j$. At each outer end of the machine-frame we locate, as before stated, a bench or table, which serves to support the leaf as it is fed into the machine and the cleaned fiber as it emerges from the machine; and we also dispose alongside of each inner roll $d'$ and $k'$ a shelf, $m$ or $m'$, which also serves to support the fiber in its passage through the machine. The plate or shelf $m$ may or should be placed so near the roll $d'$ as to scrape from off its periphery any glutinous or gummy matter which might otherwise adhere thereto and accumulate about it, and the plate $m'$ may serve a like office for the roll $k'$. Furthermore, between each two lower rolls $c'$ $d'$ and $k'$ $l'$ is placed a leaf or shelf, $n$ or $n'$, the purpose of which is similar to that of the shelf $m$ or $m^1$— that is to say, it supports the fiber as it passes along. and, when desirable or necessary, is intended to aid in scraping the surfaces of the rolls. Two sets, $o o'$, of scrapers are employed in this machine, one in advance of the rollers $k k'$ and the other in rear of the rollers $l$ and $l'$; and each set consists of two upright plates, $p^1 p$ or $p^2 p^3$, one—viz., $p^1$ or the lower—fixed immovably to the machine, and the other, $p$, movable in a vertical direction toward or away from the lower. $q$ represents a rock-shaft, mounted in opposite sides of the machine-frame and over the rollers $k l$, while upon each end of the said shaft is affixed a lever, $r$ or $r'$, the two adjacent ends of each lever being pivoted to the movable scraper next adjacent to it. By means of the lever $r'$ one or the other of the movable scrapers may be depressed upon its companion and the opposite one elevated above its companion, since only one pair of scrapers is in operation at one time. The ends of these scrapers play in vertical grooves $t t$ formed in opposite sides of the machine-frame, in which they fit with sufficient closeness to prevent accumulation of gummy, viscid, or glutinous matter which may exude from the pith of the plant as the fibers are scraped from it. The scrapers may be curved, straight, irregular, or zigzag in their outline; but we prefer to make them of the form shown in the drawing, for the reason that the bearing surface is longer than that of a straight one, while their scraping-edge, being placed at an angle to the line of draft of the fiber as it is drawn between them, cleans the fiber much more effectually and easily than would be the case were the said cutting-edge and line of draft at right angles to each other. Between the pulleys D D' we mount upon the shaft E a suitable clutch mechanism, $s$, which, while sliding freely upon the shaft, revolves with it; and we connect this clutch mechanism with a suitable upright hand-lever, $t$, as shown in Fig. 5 of the drawing. By means of the lever $t$ and its connections the clutch is thrown into engagement with one or the other of the pulleys D D', and these pulleys, as before stated, run in opposite directions. Under the arrangement herein shown, if the operator pulls the lever toward him to its greatest extent the clutch $s$ is thrown into engagement with the pulley D', causing the rollers to revolve in one direction. If, on the other hand, the lever is pushed away from the operator to its limit, the clutch engages with the other pulley D, which drives the rolls in a direction opposite to that in which they would be driven by pulley D'. Placed at a point intermediate between the two pulleys, the clutch is disengaged from both, and they travel loosely about the shaft. H, in the accompanying drawing, represents a long trough placed between the side standards of the machine frame, at the upper part thereof, and filling the transverse space between them, this trough joining at each end with the shelves $m$ $m'$, hereinbefore named, and serving to contain water in which to immerse the broken or crushed leaves before they are subjected to the action of the scrapers, as we have found it desirable to treat some species of plants in this manner.

The *Agave Amaryllis* family contains several varieties, and it is the *Agave* in some one or more of its varieties that this machine is intended to utilize, since the leaves of these plants contain a large amount of long, straight, strong fibers, arranged in regular parallel masses embedded in and surrounded by a crispy pith which binds them together.

In operating with the above machine, the clutch is engaged with the pulley, and the leaf is introduced, first between the initial or macerating rolls $c d$, which rupture or crush the vesicles of the leaf, and convert the latter into a broken pulpy mass, the fibers themselves being uninjured and intact. The leaf in this condition passes over the sheaf or scraper $n$, and enters between the press-rolls $d d'$, which lay hold of and feed forward the macerated leaf, the passage of such leaf between these rolls having the effect of removing its juice or liquid, or semi-liquid portions, the liquid thus exuding falling into a suitable tank placed below the rolls from which it may be fed to any desirable locality.

With some leaves the above treatment is all that is necessary to render them fit for the action of the scrapers; but we have treated others, which render an additional pair of rollers desirable, in order to condense or solidify the pith of the leaf preparatory to its being acted upon by the scrapers. We have not, however, shown these additional rolls in the accompanying drawing, as their use is not arbitrary, but is simply a matter of degree of pressure which may be exerted upon a leaf, and to which our invention is in no degree limited.

As more or less glutinous or gummy matter may adhere to the periphery of one or both rolls $d d'$, we have so formed and placed the shelf or plate $n$ as to constitute it a support for the leaf as it passes from one set of rolls to the other, and as a scraper to clean the periphery of the lower roll $d'$, and we usually place a second bar in such position that it shall serve a like purpose for the upper roll. Emerging from the rolls $d d'$ the leaf, with its crushed but ropy and gummy envelope, passes through the water contained in the tank, provided this water be used or otherwise over its bottom and cutters between the scrapers $p p'$, and is seized by the draft-rollers $k k'$, from which it passes between and is again seized by the last pair of rollers $l l'$. The conjoint action of the duplicate set of rollers drags the leaf along, and at the same time, by means of the levers $r$ or $r'$, the scraper-bar $p$ is depressed, and the leaf caught between it and its fellow $p'$, the continued passage of the leaf between the scrapers having the effect of stripping or cleaning the pulp from about the fibers, and laying bare the latter, which remain disposed in a uniform parallel mass. This last-named action of the machine operates upon nearly the entire length of the leaf except but a portion of its butt, which must of necessity be seized by the rollers, in order to obtain a hold upon the leaf, and this portion of the butt remains unacted upon. In order to clean this portion of the leaf, and to repeat the scraping process over the entire leaf without introducing it to the machine, the reversing mechanism, herein shown, is provided. For instance, the leaf is introduced, butt first, between the crushing-rollers, as stated, and seized by the draft-rollers when the first movable scraper $p$ is lowered toward its fellow $p'$; and the leaf drawn between them, the pith or pulp being removed from the fibers in the act, and the latter being deposited in regular parallel order. As the leaf is advanced by the rollers $k\ k'$, it is seized by the rollers $l\ l'$, and drawn forward until its last end has been forced between the scrapers $p\ p'$. The reversing mechanism is now changed and the rollers $k\ k'$ and $l\ l'$ driven in the opposite direction, the scraper $p$ being elevated and the scraper $p^2$ depressed toward its fellow $p^3$, the action of the rollers producing a return or reverse movement of the leaf, which draws its butt between the scrapers, and cleans or lays bare the fibers in such butt. The mechanism is again reversed, and the leaf or fibers thereof, with such pulp as may adhere to them, drawn between the first-named scrapers, the cleaned fibers being finally ejected from the machine. This reversing of the motion of the machine may be repeated several times, if found necessary, as it is often the case that a leaf cannot be thoroughly treated by passing once between the scrapers. The water contained in the tank, especially if of a high temperature, aids in the softening of the gummy or glutinous matter contained in the pulp of the leaf, and renders the detaching of the fibers an easy task in many cases.

Fig. 6 in the accompanying drawing represents a form of scrapers which we propose to employ in this machine when treating certain leaves which are very narrow, and which possess a thick and tough outer cuticle or envelope. In this case we employ double scrapers, one of which, or that which constitutes the upper one in the machine, is shown as composed of a flat plate or base, $b^2$, to extend across the machine, and a corrugated or zigzag plate, $c^2$, to overlap the former and project sufficiently far below it as to seize and strip from the leaf the skin which envelopes it, while the plate $b^2$ serves the purpose of cleaning the fibers of the leaf. Between each corrugation or swell of the plate $c^2$, or at certain distances apart throughout the length of such plate, we dispose a series of bars, $d^2\ d^2$, &c., the intervening distance being sufficient to receive a narrow leaf and to prevent a general interference of a number of leaves which may be passing through the machine at the same time. The duplicate of a scraper thus formed is to be deposited below it in order to obtain a pair.

Claims.

1. We claim in machinery, substantially such as described, for cleaning fibrous plants, the employment of two or more sets of scrapers and a suitable driving and reversing mechanism, substantially in the manner and for the purposes shown and set forth.

2. We claim the tank H, in combination with the breaking or crushing-rolls and draft or feed-rolls and the scrapers, substantially as explained.

G. E. HOPKINS.
WM. B. SHEDD.

Witnesses:
FRED. CURTIS,
H. H. BRYANT.